US009696455B2

United States Patent
Radtke et al.

(10) Patent No.: US 9,696,455 B2
(45) Date of Patent: Jul. 4, 2017

(54) AUTOMATED CONTROL OF ELECTRICALLY OPERATED RADIATION GENERATORS

(71) Applicant: Schlumberger Technology Corporation, Sugar Land, TX (US)

(72) Inventors: Richard J. Radtke, Pearland, TX (US); Christian Stoller, Princeton Junction, NJ (US); Michael D. Hackbart, Missouri City, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 62 days.

(21) Appl. No.: 14/940,048

(22) Filed: Nov. 12, 2015

(65) Prior Publication Data

US 2017/0139075 A1 May 18, 2017

(51) Int. Cl.
*G01V 5/10* (2006.01)
*G01V 5/12* (2006.01)

(52) U.S. Cl.
CPC ............. *G01V 5/104* (2013.01); *G01V 5/12* (2013.01)

(58) Field of Classification Search
CPC . G01V 5/08; G01V 5/101; G01V 5/04; G01V 5/06; G01V 5/107; G01V 3/18; G01V 5/102; G01V 5/104; G01V 1/40; E21B 49/00; E21B 47/122
USPC .................................................. 250/269.7
See application file for complete search history.

(56) References Cited

U.S. PATENT DOCUMENTS

| | | | |
|---|---|---|---|
| 3,147,378 A * | 9/1964 | Hall, Jr. ................ | G01V 5/145 250/265 |
| 3,461,291 A | 8/1969 | Goodman | |
| 6,105,688 A | 8/2000 | Vaynshteyn et al. | |
| 6,298,924 B1 | 10/2001 | Vaynshteyn et al. | |
| 6,649,906 B2 | 11/2003 | Adolph et al. | |
| 8,346,481 B2 | 1/2013 | Jacobson et al. | |
| 8,944,162 B2 | 2/2015 | Dorffer et al. | |
| 8,996,315 B2 | 3/2015 | Guo et al. | |
| 2015/0041633 A1 | 2/2015 | Guo et al. | |
| 2016/0061991 A1* | 3/2016 | Berkcan ................ | G01V 5/145 250/269.2 |

OTHER PUBLICATIONS

Radtke, et al. "A new capture and inelastic spectroscopy tool takes geochemical logging to the next level," SPWLA 53rd Annual Logging Symposium, Jun. 16-20, 2012, pp. 1-16.

* cited by examiner

*Primary Examiner* — Don Wong
(74) *Attorney, Agent, or Firm* — Michael Dae (57) ABSTRACT

The present disclosure describes a downhole tool that includes an electrically operated radiation generator that selectively outputs radiation to a surrounding environment based at least in part on supply of electrical power; a radiation detector that determines a first radiation metric based at least in part on first radiation measured when the electrically operated radiation generator is outputting radiation and that determines a second radiation metric based at least in part on second radiation measured when the electrically operated radiation generator is not outputting radiation; and a control system that determines whether the surrounding environment is properly shielded based at least in part on a relationship between the first radiation metric and the second radiation metric.

20 Claims, 6 Drawing Sheets

AUTOMATED CONTROL OF ELECTRICALLY OPERATED RADIATION GENERATORS

BACKGROUND

The present disclosure relates generally to electrically operated radiation generators and, more particularly, to controlling operation of the electrically operated radiation generators.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Generally, an electrically operated radiation generator, such as an x-ray generator, a gamma ray generator, or a neutron generator, may generate radiation using electrical power on-demand to facilitate determining characteristics of its surrounding environment. Thus, electrically operated radiation generators may be used in various contexts, such as a downhole tool or for material analysis. For example, in a downhole tool, an electrically operated radiation generator may facilitate determining porosity of surrounding formations based at least in part on count (e.g., number of neutrons or gamma-rays) of radiation and/or mineralogy of surrounding formations based at least in part on spectrum of radiation measured by a detector (e.g., a scintillator).

To facilitate determining the characteristics, the electrically operated radiation generator may output high energy radiation into its surrounding environment. Once output, the high energy radiation may interact with atoms in the surroundings, for example, transferring energy to an atom and/or causing the atom to release one or more types of radiations.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter. Other aspects and advantages will be apparent from the description and claims that follow.

A downhole tool according to one aspect of the current disclosure includes an electrically operated radiation generator configured to selectively output radiation to a surrounding environment based at least in part on supply of electrical power. The downhole tool further includes a radiation detector that is configured to measure first radiation when the electrically operated radiation generator is outputting radiation and second radiation when the electrically operated radiation generator is not outputting radiation. The downhole tool further includes a control system that is configured to determine a first radiation metric based at least in part on the first radiation, a second radiation metric based at least in part on the second radiation, and whether the surrounding environment is properly shielded based at least in part on a relationship between the first radiation metric and the second radiation metric.

The current disclosure further illustrates a system including an electrically operated radiation generator configured to selectively output radiation to a surrounding environment, and a radiation detector configured to measure radiation from the surrounding environment induced by the output radiation. The system further includes a control system configured to determine a first radiation metric based at least in part on the output radiation, a second radiation metric based at least in part on radiation measured by the radiation detector; and whether the surrounding environment is operating under a desired condition based at least in part on a relationship between the first radiation metric and the second radiation metric.

The current disclosure further describes a system for logging a subterranean formation. The system includes an electrically operated radiation generator configured to output radiation to a surrounding environment and a control system coupled to the electrically operated radiation generator. The control system is configured to determine a first radiation metric based at least in part on the output radiation, a second radiation metric based at least in part on a signal from the surrounding environment in response to the radiation; and whether the surrounding environment is operating under a desired condition based at least in part on a relationship between the first radiation metric and the second radiation metric.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are examples of the presently disclosed techniques. Additionally, in an effort to provide a concise description of these embodiments, not all features of an actual implementation may be described in the specification. It should be appreciated that in the development of any such actual implementation, as in any engineering or design project, numerous implementation-specific decisions will be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As mentioned above, an electrically operated radiation generator may generate and output radiation to facilitate determining characteristics (e.g., porosity and/or mineralogy) of its surrounding environment. Depending on the characteristics to determine, various types of electrically operated radiation generators may be used, such as an x-ray generator, a gamma ray generator, or a neutron generator. Generally, the different types of electrically operated radiation generators may output different types of radiation. For example, an x-ray generator may output x-ray radiation, a gamma ray generator may output gamma ray radiation, and a neutron generator may output neutron radiation.

Nevertheless, the different types of electrically operated radiation generators may be operationally similar. For example, electrical power may be supplied to accelerate a particle (e.g., ion or electron) toward a target. When the particle strikes atoms in the target, radiation may be generated and output. The radiation may then interact with atoms in the surrounding environment, for example, causing the atom to output radiation (e.g., a neutron and/or gamma rays). A detector (e.g., sensor) may then measure count (e.g., amount), count rate (e.g., amount per unit time) and/or other properties of the radiation returned from the surrounding environment. Based at least in part on such measured properties, characteristics of the surrounding environment, such as porosity and/or mineralogy, may be determined.

To cause the atoms in the surrounding environment to output radiation, the electrically operated radiation generator may output radiation at high energies. For example, a pulsed neutron generator may output neutrons from between two to fourteen megaelectron-volts. Due to this high energy, it may be desirable to operate the electrically operated radiation generator in some environments and not others. For example, it may be desirable to output radiation from an electrically operated radiation generator when living beings are properly shielded from the radiation (e.g., when the generator is downhole or in a shield when operated at surface) and undesirable to output radiation when living beings are not properly shielded from the radiation (e.g., operating the generator at or close to surface without shielding or insufficient shielding).

Accordingly, as will be described in more detail below, the present disclosure provides techniques to determine characteristics of the surrounding environment and control the operation of an electrically operated radiation generator based at least in part on such characteristics to reduce likelihood of outputting radiation when undesirable. In some embodiments, a control system may automatically determine characteristics of the surrounding environment and control operation of the electrically operated radiation generator accordingly. To determine the characteristics, the control system may determine a first radiation metric when the electrically operated radiation generator is outputting radiation and a second radiation metric when the electrically operated radiation generator is not outputting radiation. In some embodiments, the radiation metric may indicate the amount of radiation determined by one or more detectors.

Based at least in part on a relationship between the first radiation metric and the second radiation metric, characteristics of the surrounding environment may be determined. In some embodiments, the relationship may indicate when radiation output is desirable and when radiation output is undesirable. For example, when the result of the relationship between the two metrics is within a first (e.g., desired) range, the control system may determine that the surrounding environment (e.g., a formation and/or radiation barrier and/or soil and/or rocks) properly shields living beings from output radiation. On the other hand, when the result of the relationship is within a second (e.g., undesired) range, the control system may determine that the surrounding environment (e.g., air) does not properly shield living beings from output radiation. In this manner, the control system may control operation of the electrically operated radiation generator to reduce amount and/or likelihood of exposing living beings (e.g., operators) to high energy radiation.

Electrically Operated Radiation Generators

Since they are useful to help determine characteristics of their surrounding environment, electrically operated radiation generators may be used in various contexts, such as resource (e.g., oil and/or gas) exploration contexts or material analysis contexts. For example, in resource exploration, an electrically operated radiation generator may be included in a downhole tool to determine characteristics of sub-surface formations, such as porosity and/or mineralogy. To simplify discussion, the present disclosure will be described with regard to a downhole tool. However, one of ordinary skill in the art should appreciate that the techniques described herein may be applied to the use of electrically operated radiation generators in other contexts.

Even within downhole tools, the implementation of electrically operated radiation generators may vary. To help illustrate, FIG. 1 describes use in a drilling system 10, which may be used to drill a well through sub-surface formations 12. In the depicted embodiment, a drilling rig 14 at the surface 16 may rotate a drill string 18, which includes a drill bit 20 at its lower end to engage the subsurface formations 12. To cool and/or lubricate the drill bit 20, a drilling fluid pump 22 may pump drilling fluid, commonly referred to as "mud" or "drilling mud," downward through the center of the drill string 18 in the direction of the arrow 24 to the drill bit 20. At the drill bit 20, the drilling fluid may then exit the drill string 18 through ports (not shown). The drilling fluid may then flow in the direction of the arrows 28 through an annulus 30 between the drill string 18 and the formation 12 toward the surface 16. In this manner, the drilling fluid may carry drill cuttings away from the bottom of a borehole 26. Once at the surface 16, the returned drilling fluid may be filtered and conveyed back to a mud pit 32 for reuse.

Figure 1:
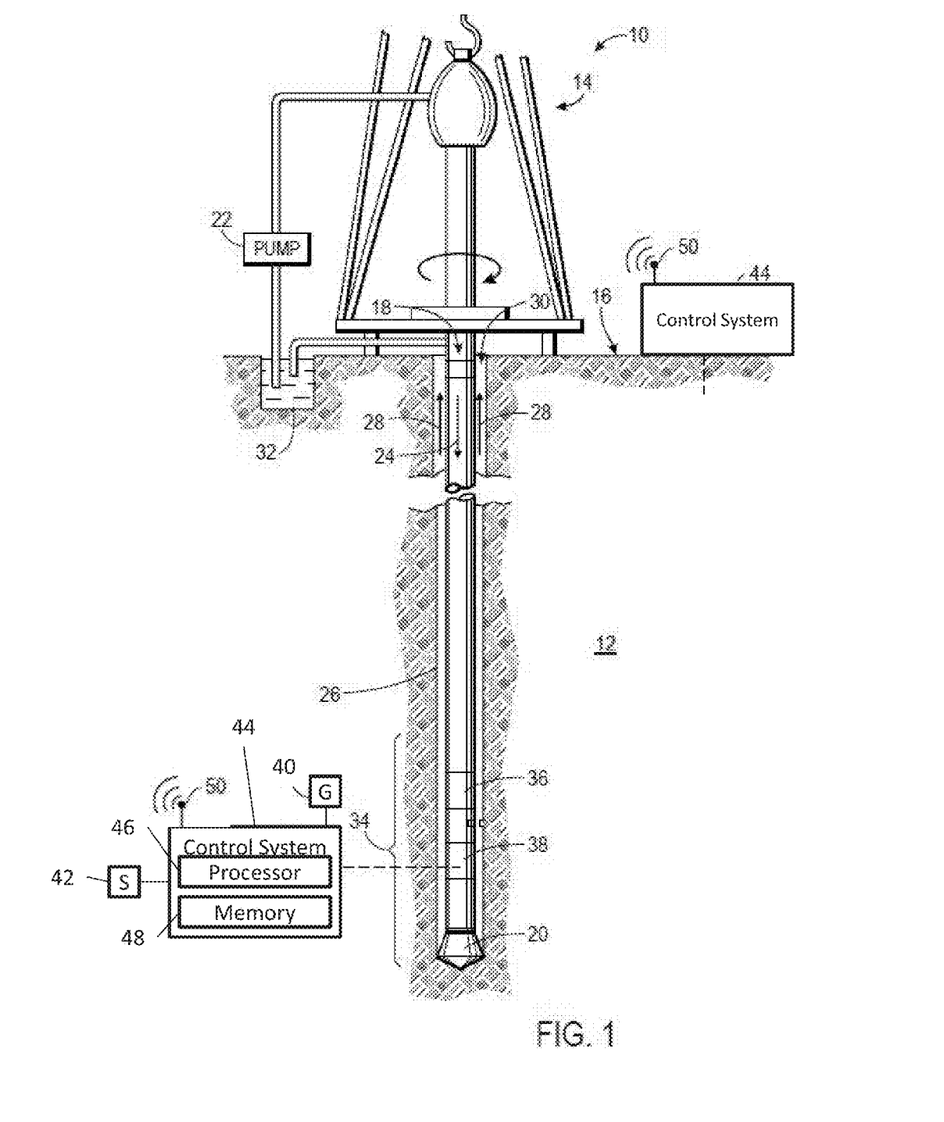
FIG. 1 is a schematic diagram of a drilling system including a downhole tool with an electrically operated radiation generator, in accordance with an embodiment.

Additionally, as depicted, the lower end of the drill string 18 includes a bottom-hole assembly 34 that includes the drill bit 20 along with various downhole tools, such as a measuring-while-drilling (MWD) tool 36 and a logging-whiledrilling (LWD) tool 38. Generally, the downhole tools (e.g., MWD tool 36 and LWD tool 38) may facilitate determining characteristics of the surrounding formation 12. Thus, in some embodiments, the LWD tool 38 may include an electrically operated radiation generator 40, which outputs radiation into the surrounding formation 12, and one or more radiation sensors 42, which may measure radiation returned from the surrounding formation 12.

In some embodiments, a control system 44 may control operation of the LWD tool 38. For example, the control system 44 may instruct the electrically operated radiation generator 40 when to output radiation, instruct the electrically operated radiation generator 40 when to cease outputting radiation, receive measurements from the sensors 42, and/or process the measurements to determine characteristics of the surrounding environment (e.g., formation 12). In some embodiments, the control system 44 may be included in the LWD tool 38. In other embodiments, the control system 44 may be separate from the LWD tool 38, for example, in another downhole tool or at the surface 16. In other embodiments, a portion of the control system 44 may be included in the LWD tool 38 and another portion may be located separate from the LWD tool 38.

When at least a portion is separate from the LWD tool 38, information (e.g., measurements and/or determined characteristics) may be transmitted to and/or within the control system 44 for further processing, for example, via mud pulse telemetry system (not shown) and/or a wireless communication system (not shown). Accordingly, in some embodiments, the LWD tool 38 and/or the control system 50 may include wireless transceivers 50 to facilitate communicating information.

To facilitate controlling operation, the control system 44 may include one or more processors 46 and one or more memory 48. In some embodiments, the processor 46 may include one or more general purpose microprocessors, one or more application specific processors (ASICs), one or more field programmable logic arrays (FPGAs), or any combination thereof. Additionally, the memory 48 may be a tangible, non-transitory, computer-readable medium that stores instructions executable by and data to be processed by the processor 46. Thus, in some embodiments, the memory 48 may include random access memory (RAM), read only memory (ROM), rewritable flash memory, hard drives, optical discs, and the like.

Figure 2:
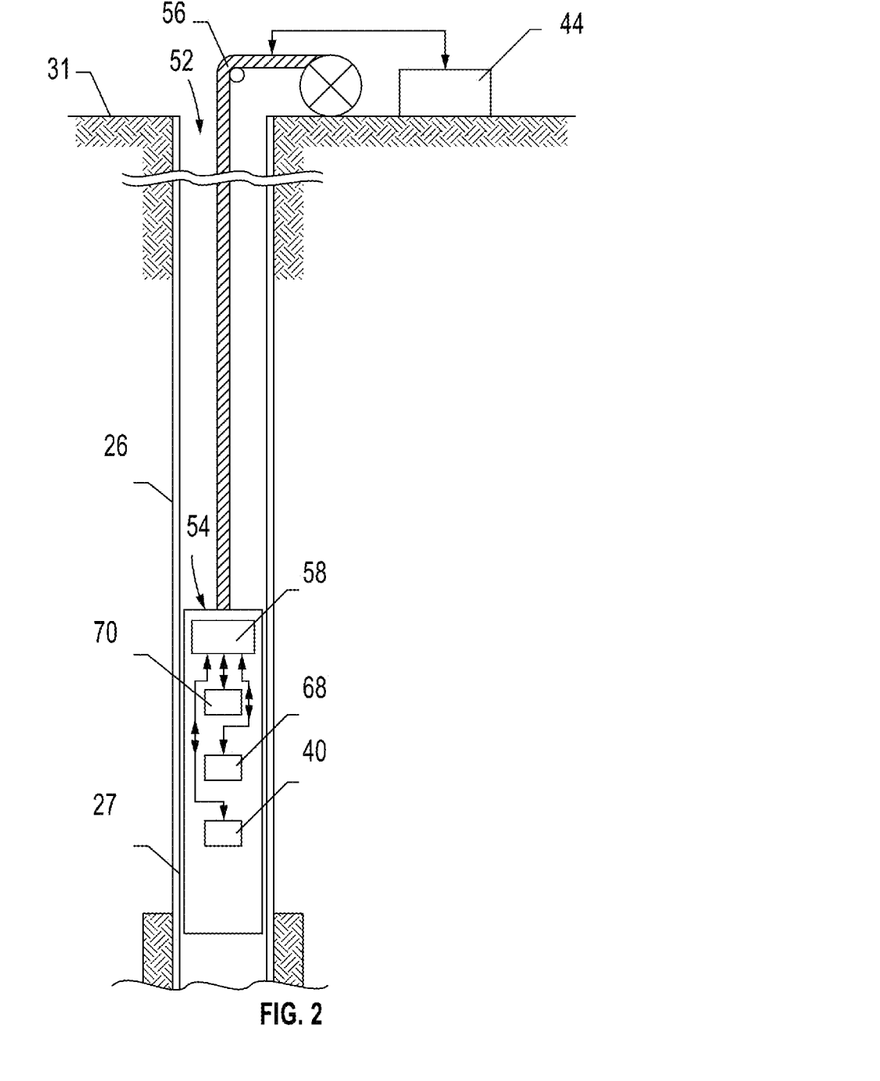
FIG. 2 is a schematic diagram of a wireline system including a downhole tool with an electrically operated radiation generator, in accordance with an embodiment.

In addition to the LWD tool 38, an electrically operated radiation generator 40 may be used in a wireline system 52, as described in FIG. 2. In the depicted embodiment, the wireline system 52 includes a wireline instrument 54 suspended in the borehole 26 and coupled to at least a portion of the control system 44 via a cable 56. Besides the radiation generator 40, the wireline instrument 54 may further contain one or more gamma ray detectors 68 and/or one or more neutron detectors 70, each disposed at a different axial spacing from the radiation generator 40. The radiation generator 40 can be an electrically operated pulsed neutron generator (PNG) to emit neutron radiations. Shielding (not shown) may be applied between the radiation generator 40 and the detectors 68, 70 to reduce direct transmission of neutrons from the radiation generator 40 to the detectors 68, 70. Thus, detected radiation may be characterized at each of a plurality of distances from the radiation generator 40, and thus have different lateral response (depth of investigation) into the formations surrounding the borehole 26. In some examples, two or more different types of well logging instrument, each having a different type of source and different types of corresponding detectors may be included in the same instrument assembly of "tool string."

The instrument 54 maybe coupled to an armored electrical cable 56 that may be extended into and retracted from the borehole 26. The borehole 26 may or may not include metal pipe or casing 27 therein. The cable 56 conducts electrical power to operate the instrument 54 from a surface 31 deployed the control system 44. Signals from the detectors 68, 70 may be processed by suitable circuitry 58 for transmission along the cable 56 to the control system 44 for recording and/or further processing. The control system 44 may include a processor, computer or computer system as explained herein.

Although described in relation to a drilling system 10 and a wireline system 52, electrically operated radiation generators 40 may also be used in other implementations of downhole tools. For example, an electrically operated radiation generator 40 may be used in a coiled tubing system, a wired drill pipe system, a slick line system, or the like. Although implementation may vary, operation of an electrically operated radiation generator 40 may be generally similar in a downhole tool.

Figure 3:
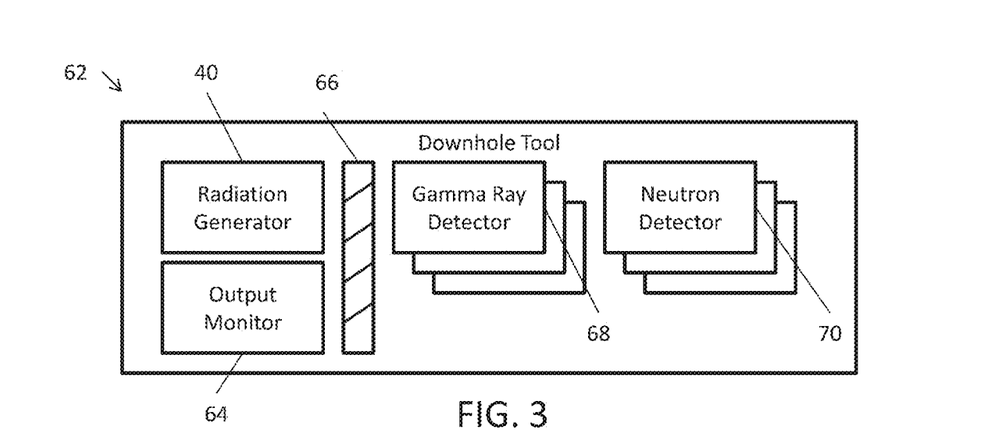
FIG. 3 is a block diagram of a downhole tool with an electrically operated radiation generator, in accordance with an embodiment.

To help illustrate, one embodiment of a downhole tool 62 is described in FIG. 3. In the depicted embodiment, the downhole tool 62 includes an electrically operated radiation generator 40, an optional output radiation monitor 64, an optional shielding 66, one or more radiation detectors such as one or more gamma ray detectors 68, and/or one or more neutron detectors 70. As described above, the electrically operated radiation generator 40 may generate output radiation, such as gamma rays or neutrons, into its surrounding environment. In some embodiments, characteristics of the surrounding environment may be determined based at least in part on amount and/or properties (e.g., energy) of radiation output and/or radiation received from the environment.

Accordingly, to facilitate determining the characteristics, the output radiation monitor 64 may monitor the amount and/or properties of the radiation output from the electrically operated radiation generator 40. Thus, in some embodiments, the output radiation monitor 64 may be a plastic scintillator coupled to a photomultiplier that primarily detects unscattered neutrons emitted from the electrically operated radiation generator 40. In such embodiments, the output radiation monitor 64 may facilitate determining a count (e.g., number of neutrons) and/or a count rate (e.g., number of neutrons per unit time) of radiation (e.g., fast neutrons) output from the electrically operated radiation generator 40. In some other embodiments, the output radiation monitor 64 is omitted. In such embodiments, the level of radiation output can be inferred or otherwise determined indirectly from circumstantial parameters such as operating conditions of the generator. Examples of such parameters include, but are not limited to, an ion beam current, an ion source filament current, a target voltage, an ion source grid current. In some embodiments, the radiation generator's overall power consumption by itself can be used as an indicator of the radiation output level of the generator.

As described above, characteristics may be determined based on interaction between output radiation and atoms in the surrounding environment. Neutrons emitted by the generator may interact with the surrounding materials in different ways. They may collide inelastically with a nucleus and as a result of the interaction the nucleus or nuclear reaction product may emit one or more gamma rays (so-called inelastic gamma rays). Output neutrons may collide elastically with nuclei in the surrounding materials and slow down to become an epithermal and eventually thermal neutrons. Slow neutrons may be captured by nuclei and the capture may be followed by the emission of one or more gamma rays (capture gamma rays). Generally, the radiation (e.g., neutrons and/or gamma rays) output from an atom may depend at least in part on properties (e.g., atomic number or atomic mass) of the atom. As such resulting radiation may indicate the type of materials in the surrounding formation 12.

Accordingly, to facilitate determining the characteristics, the downhole tool 62 may include one or more radiation detectors, such as one or more gamma ray detectors 68 and/or one or more neutron detectors 70. For the same reason, the downhole tool may contain one or more radiation detectors than can detect both neutron and gamma ray radiation (not shown). Since characteristics of the surrounding environment are determined based on radiation received from the surrounding environment, shielding 66 may be positioned between the electrically operated radiation generator 40 and the gamma ray detector 68/neutron detector 70 to reduce likelihood of radiation internally passing through the downhole tool 62.

Specifically, a gamma ray detector 68 may detect gamma rays (e.g., neutron capture gamma rays and/or inelastic gamma rays) that pass from the surrounding environment (e.g., formation 12) into the downhole tool 62. In some embodiments, the gamma ray detector 68 may be a scintillator detector that detects gamma rays by emitting light when a gamma ray interacts with the atoms of its crystal. Additionally, in some embodiments, the gamma ray detector 68 may be surrounded by neutron shielding to reduce likelihood of neutrons entering the gamma ray detector 68. In this manner, the gamma ray detector 68 may facilitate determining a count (e.g., number of gamma rays) and/or a count rate (e.g., number of gamma rays per unit time) of radiation received from its surrounding environment (e.g., formation 12).

Additionally, a neutron detector 70 may detect neutrons (e.g., epithermal and/or thermal neutrons) that pass from the surrounding environment (e.g., formation 12) into the downhole tool 62. In some embodiments, the neutron detector 70 may be a gas proportional detector that detects neutrons based on ionization induced in the gas by received neutrons. Additionally, in some embodiments, the neutron detector 70 may be surrounded by neutron shielding depending on the type of neutrons to be detected. For example, an epithermal neutron detector may be surrounded by thermal neutron shielding to reduce likelihood of thermal neutrons entering the neutron detector 70. In this manner, the neutron detector 70 may facilitate determining a count (e.g. number of neutrons) and/or a count rate (e.g., number of neutrons per unit time) of radiation received from its surrounding environment (e.g., formation 12). The neutron detector 70 may be a fast neutron detector detecting high energy neutrons. Such a detector may be a plastic scintillator coupled to a photomultiplier. Such a detector may detect fast neutrons that may have been scattered in the material surrounding the tool (e.g. the formation 12). The resulting neutron counts or count rates can be used to determine a characteristic of the material surrounding the tool (e.g. the formation 12).

As described above, various types of electrically operated radiation generators 40 may be used. However, the various types may be operationally similar. Specifically, the electrically operated radiation generator 40 may use electrical power to generate ions and/or electrons and to accelerate the ions and/or electrons toward a target. Upon striking the target, radiation may be output from the electrically operated radiation generator 40. To simplify discussion, the electrically operated radiation generator 40 will be described as a pulsed neutron generator (PNG). However, one of ordinary skill the art should recognize that the techniques described herein may be applied to other types of electrically operated radiation generators 40.

Figure 4:
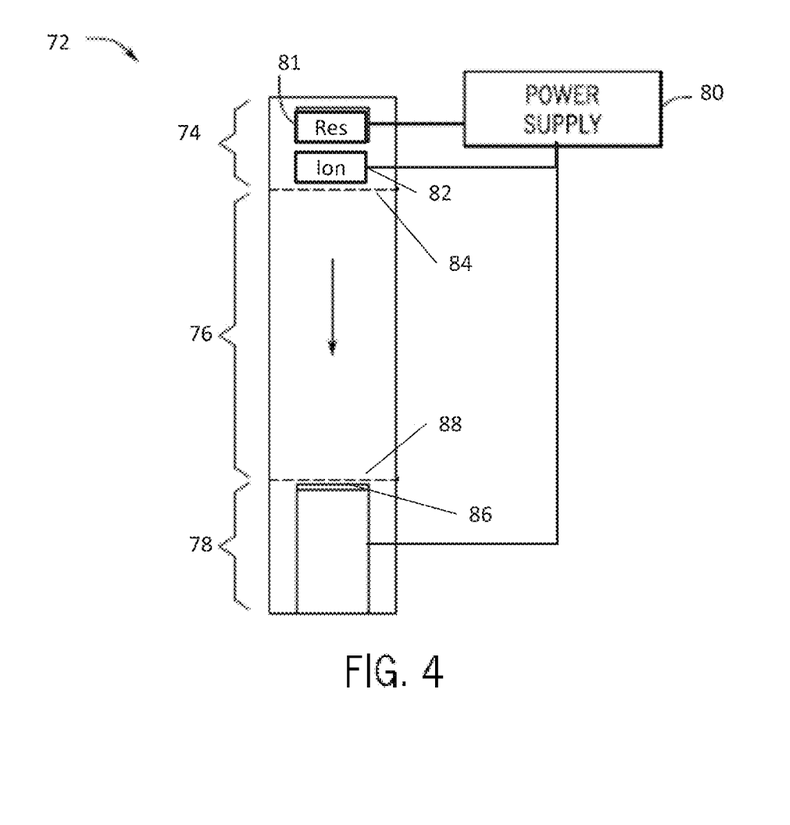
FIG. 4 is a schematic diagram of the electrically operated radiation generator of FIG. 3, in accordance with an embodiment.

One example of a pulsed neutron generator 72 is shown in FIG. 4. Generally, a pulsed neutron generator 72 includes an ion source 74, an accelerating gap 76, a target 78, and one or more power supplies 80, which supply electrical power to the ion source 74 and/or the target 78. In the depicted embodiment, the ion source 74 includes a gas reservoir 81, an ionizer 82, and an extractor electrode (e.g., grid) 84. Additionally, in the depicted embodiment, the target 78 includes a target layer 86 and a suppressor electrode 88.

In operation, the gas reservoir 81 may release molecules of hydrogen isotopes as gas. In some embodiments, when electrical power is supplied from the power supply 80, a filament may increase in temperature causing a getter containing hydrogen isotopes (e.g., deuterium and/or tritium) to release the hydrogen isotopes as gas. As gas is released, pressure in the gas reservoir 81 may increase causing the hydrogen isotope gas to flow into the ionizer 82.

The ionizer 82 may then ionize the hydrogen isotope gas received from the gas reservoir 81. In some embodiments, when electrical power is supplied from the power supply 80, a cathode may output electrons. Additionally, when electrical power is supplied from the power supply 80, an anode may generate an electrical field at the cathode causing the electrons to flow toward the anode. As the electrons are pulled toward the anode, the electrons may impact and ionize and dissociate the molecules of the hydrogen isotopes, thereby generating positive ions of the hydrogen molecules or atoms.

The extractor electrode 84 may then extract the hydrogen ions from the ion source 74 into the accelerating gap 76. In some embodiments, when electrical power is supplied from the power supply 80, an electric field may be generated between the extractor electrode 84 and the suppressor electrode 88 that accelerates the hydrogen ions toward the suppressor electrode 88 and toward the target layer 88.

In some embodiments, the target layer 86 may be a thin film of titanium, scandium or other metal known to form hydrides. In one non-limiting example, the target layer 86 is a metal hydride such as titanium hydride containing therefore deuterium and/or tritium. As such, when the hydrogen ions collide with deuterium or tritium atoms in the target layer 86, a fusion reaction that releases high energy neutrons (e.g., 14 MeV) may occur. In other words, the supply of electrical power may control extraction and acceleration of the hydrogen ions and, thus, output of radiation from the electrical operated radiation generator 40. In fact, in some embodiments, the power supply 80 may pulse the electrical power supplied to the extractor electrode 84 to generate bursts of neutron radiation. In this manner, the electrically operated radiation generator 40 may be operated to control when radiation (e.g., high energy neutrons) is output to its surroundings (e.g., formation 12).

Automated Control System

As describe above, the control system 44 may control operation of the electrically operated radiation generator 40, for example, by controlling supply of electrical power from the power supply 80. In fact, in some embodiments, the control system 44 may automatically control when to output radiation based at least in part on the surrounding environment of the electrically operated radiation generator 40. For example, the control system 44 may instruct the electrically operated radiation generator 40 to output radiation when living beings in its surrounding environment are properly shielded and not to output radiation when living beings in its surrounding environment are not properly shielded.

Figure 5:
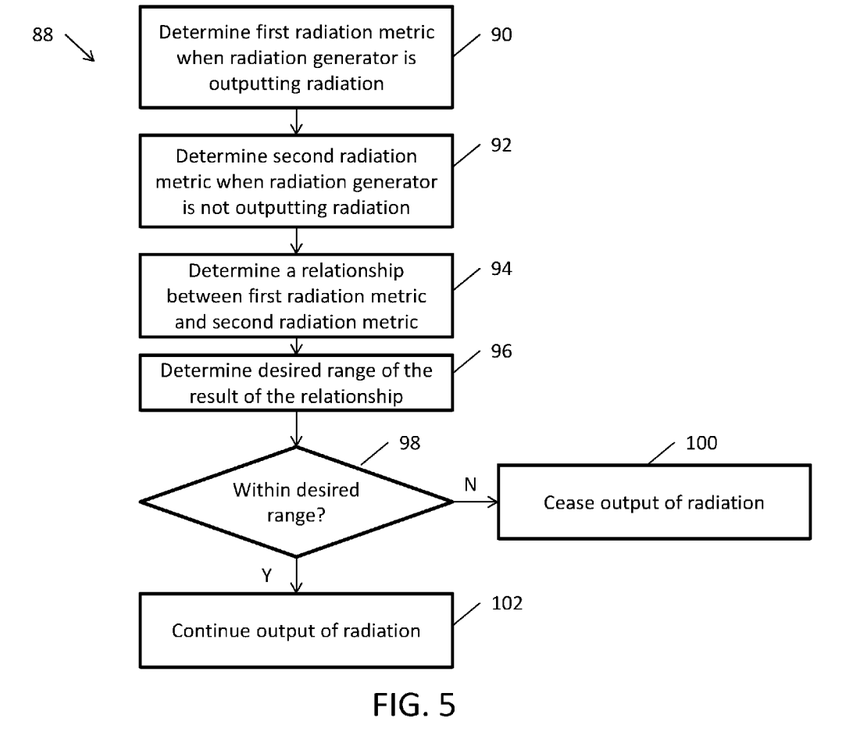
FIG. 5 is a flow diagram of a process for controlling operation of the electrically operated radiation generator of FIG. 3, in accordance with an embodiment.

To help illustrate, one embodiment of a process 88 for automatically controlling operation of an electrically operated radiation generator 40 is described in FIG. 5. Generally, the process 88 includes determining a first radiation metric when an electrically operated radiation generator is outputting radiation (process block 90), determining a second radiation metric when the electrically operated radiation generator is not outputting radiation (process block 92), determining a relationship between the first radiation metric and the second radiation metric (process block 94), determining a desired range of the result of the relationship (process block 96), determining whether the result is within the desired range (decision block 98), ceasing output of radiation from the electrically operated radiation generator when not within the desired range (process block 100), and continuing output of radiation from the electrically operated radiation generator when within the desired range (process block 102). In some embodiments, the process 88 may be implemented by executing instructions stored in a tangible, non-transitory, computer-readable medium, such as memory 48 of the control system 44, using processing circuitry, such as the processor 46 of the control system 44.

Accordingly, in some embodiments, the control system 44 may instruct the electrically operated radiation generator 40 to output radiation and determine the first radiation metric while radiation is output (process block 90). Additionally, the control system 44 may instruct the electrically operated radiation generator 40 to cease output of the radiation and determine the second radiation metric while radiation is not output (process block 92).

Generally, the first and second radiation metrics may provide an indication of radiation output from the electrically operated radiation generator 40 and/or radiation received from the surrounding environment of the electrically operated radiation generator 40. For example, in some embodiments, the first and the second radiation metrics may both be a total count (e.g., amount of radiation), a total count rate (e.g., amount of radiation per unit time), integrated charge, total energy deposited, count in an energy range, count rate in an energy range, count in a time window, count rate in a time window, count at a pulse height, count rate at a pulse height, ratio of counts above a discriminator level, ratio of count rates above a discriminator level, spectrum of counts as a function of energy, spectrum of count rates as a function of energy, spectrum of counts as a function of time, spectrum of count rates as a function of time, spectrum of counts as a function of pulse height, spectrum of count rates as a function of pulse height, spectral yield, or any combination thereof. Thus, in such embodiments, the control system 44 may determine the first and second radiation metrics based at least in part on measurements determined by the output radiation monitor 64, the one or more gamma ray detectors 68, and/or the one or more neutron detectors 70.

As described above, the control system 44 may control when the electronically operated radiation generator 40 outputs radiation by controlling supply of electrical power from the power supply 80. For example, in the pulsed neutron generator 72, the control system 44 may control supply of electrical power to at least the extractor electrode 84 and the suppressor electrode 88, thereby controlling acceleration of hydrogen ions from the ion source 74 to the target 78. In fact, in some embodiments, the control system 44 may instruct the power supply 80 to pulse electrical power supplied to the electrically operated radiation generator 40, thereby producing bursts of output radiation followed by a delay period where radiation is not output.

Figure 6:
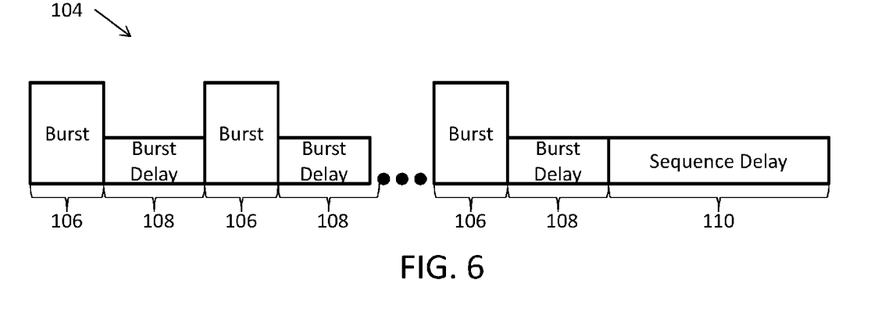
FIG. 6 is a diagrammatic representation of a burst sequence output by the electrically operated radiation generator of FIG. 3, in accordance with an embodiment.

To help illustrate, an example timing diagram describing a burst sequence 104 is described in FIG. 6. As depicted, the burst sequence 104 includes a number successive of burst periods 106 followed by burst delay periods 108. Additionally, a sequence delay period 110 is included at the end of the burst sequence 104. In some embodiments, the burst periods 106 may be eight microseconds and the burst delay periods 108 may be twenty-two microseconds. Additionally, in some embodiments, the successive burst period 106 and burst delay period 108 may be repeated fifty times. Furthermore, in some embodiments, the sequence delay period 110 may be eight milliseconds.

When implementing the burst sequence 104, the electrically operated radiation generator 40 may output radiation during the burst periods 106 and cease outputting radiation during the burst delay periods 108 and the sequence delay period 110. As such, the control system 44 may determine the first radiation metric based at least in part on measurements determined during a burst period 106 and the second radiation metric based at least in part on measurements determined during a burst delay period 108. Referring to the process 88 of FIG. 5, the control system 44 may determine a relationship between the first radiation metric and the second radiation metric (process block 94), wherein the relationship in one embodiment is a ratio. In some embodiments, the ratio may be the first radiation metric to the second radiation metric. In some other embodiments, the ratio may be the second radiation metric to the first radiation metric.

In some instances, background radiation may affect the measurements determined by the radiation detectors 42. Background radiation may be caused by radiation naturally present in the radiation detector 42 or the environment and/or radiation caused by previous radiation outputs. The background radiation may be determined based on measurements determined during a period substantially after the electrically operated radiation generator 40 ceases output of radiation. Thus, in some embodiments, the background radiation may be determined during the sequence delay period 110.

Thus, the first radiation metric and the second radiation metric may be corrected by subtracting out the background radiation. Thus, in some embodiments, first and the second radiation metrics may be as follows:

$$FM = C_{Bu} - C_{Bg} \tag{1}$$

$$SM = C_{Bd} - C_{Bg} \tag{2}$$

where FM is the first radiation metric, SM is the second radiation metric, $C_{Bu}$ is the radiation metric determined during a burst period 106, $C_{Bd}$ is the radiation metric determined during a delay period 108, and $C_{Bg}$ is the radiation metric determined during a sequence delay period 110. In fact, in some embodiments, the control system 44 may determine the first and second radiation metrics using a single successive burst period 106 and burst delay period 108. In this manner, even when living beings in the surrounding environment are not properly shielded, amount of radiation exposure may be limited, for example, to an eight microsecond burst. In some embodiments, the control system 44 may determine the first and second radiation metrics using multiple burst periods 106 and burst delay periods 108.

Returning to the process 88 of FIG. 5, the control system 44 may determine a relationship between the first radiation metric and the second radiation metric (process block 94), corrected for background effects. In some embodiments, the relationship may be a ratio of the first radiation metric to the second radiation metric, both corrected for background effects. In such embodiments, the ratio may determined be as follows:

$$R = \frac{C_{Bu} - C_{Bg}}{C_{Bd} - C_{Bg}} \quad (3)$$

where R is the ratio, $C_{Bu}$ is the radiation metric determined during a burst period 106, $C_{Bd}$ is the radiation metric determined during a delay period 108, and $C_{Bg}$ is the radiation metric determined during a sequence delay period 110. In some other embodiments, the ratio may be the second radiation metric to the first radiation metric, corrected for background effects. In such embodiments, the ratio may be determined as follows:

$$R = \frac{C_{Bd} - C_{Bg}}{C_{Bu} - C_{Bg}} \quad (3)$$

where R is the ratio, $C_{Bu}$ is the radiation metric determined during a burst period 106, $C_{Bd}$ is the radiation metric determined during a delay period 108, and $C_{Bg}$ is the radiation metric determined during a sequence delay period 110.

As described above, the first radiation metric and the second radiation metric may be determined based on interaction between output radiation and the surrounding environment. Additionally, as described above, interaction may vary based on characteristics of the surrounding environment, such as types and/or densities of atomic nuclei and their respective neutron interaction cross sections. As such, by comparing interaction when outputting and not outputting radiation, the result of the relationship may provide an indication of characteristics of the surrounding environment. For example, ratio of count rate (e.g., second radiation metric) during the burst delay period 108 to count rate (e.g., first radiation metric) during the burst period 106 may increase as density of the surrounding environment increases.

Additionally, the control system 44 may determine a desired range of the result of the relationship between the first radiation metric and the second radiation metric (process block 94). In some embodiments, the desired range of the ratio may be predetermined and stored in memory 48, for example by a manufacturer. Thus, in such embodiments, the control system 44 may determine the desired range by retrieving it from memory 48.

As described above, implementation of downhole tools 62 may vary. For example, in different embodiments, the electrically operated radiation generator 40 may output different types of radiation, different amounts of radiation, and/or different energy radiation. Additionally, in different embodiments, the number, type, and/or position of radiation detectors (e.g., gamma ray detectors 68 and/or neutron detectors 70) and/or output radiation monitors 64 may vary. Thus, the desired range of the result of the relationship may vary based at least in part on implementation of the downhole tool 62. For example, in some embodiments, the desired range may be constant while in other the desired range may vary based on operational parameters of the downhole tool 62, such as radiation output, count rate determined when outputting radiation, count rate determined when not outputting radiation, or any combination thereof. More generally, the relationship may include results of counts and count rates that may be normalized by a neutron output measurement not only from a single time gate while the radiation generator is outputting radiation or when not outputting radiation but from more than one such time gate to form a metric.

Figures 7, 8:
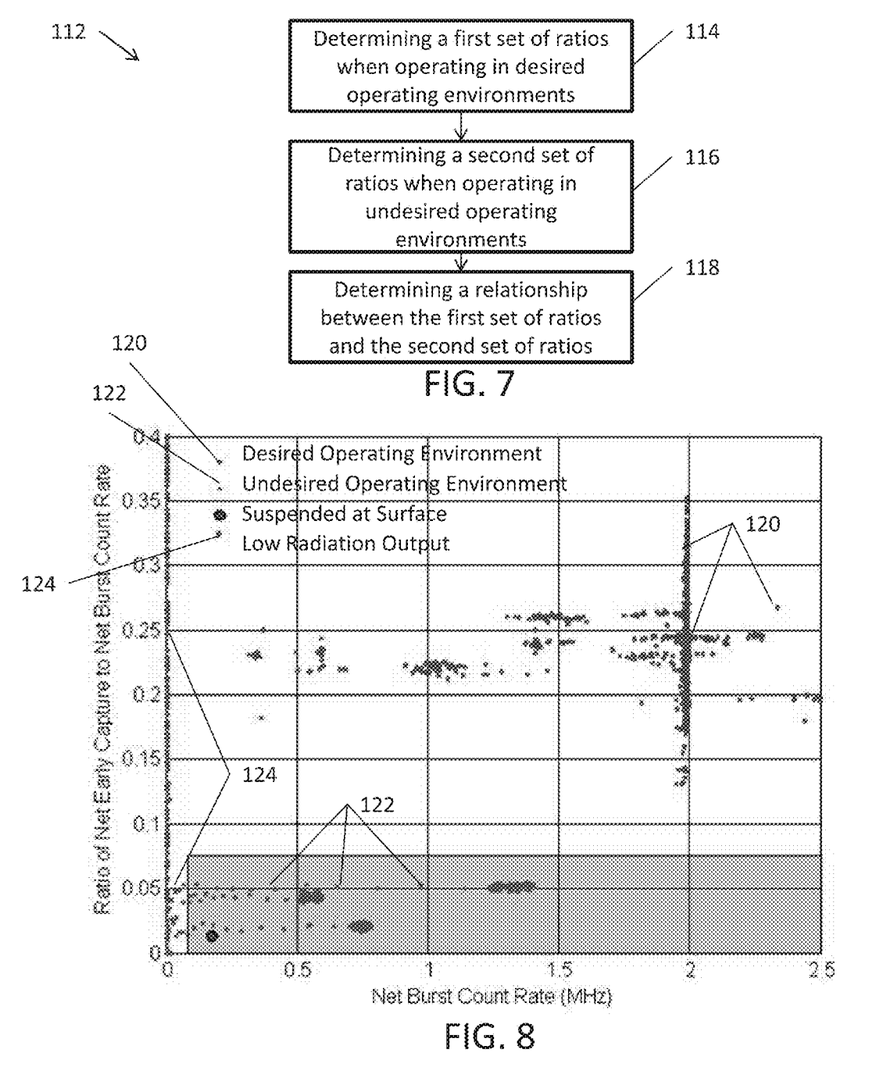
FIG. 7 is a flow diagram of a process for determining the desired range of the ratio, in accordance with an embodiment.
FIG. 8 is a plot of an example of a desired range and an undesired range of a ratio between a radiation metric when outputting radiation and a metric when not outputting radiation, in accordance with an embodiment.

One embodiment of a process 112 for determining the desired range of the relationship, which in this example is a ratio, is described in FIG. 7. The process 112 includes determining a first set of ratios when operating in one or more desired operating environments (process block 114), determining a second set of ratios when operating in one or more undesired operating environments (process block 116), and determining a relationship between the first set of ratios and the second set of ratios (process block 118). In some embodiments, the process 112 may be performed by a manufacturer by executing instructions stored in a tangible, non-transitory, computer-readable medium, such as memory 48 of the control system 44, using processing circuitry, such as the processor 46 of the control system 44.

Accordingly, in some embodiments, the manufacturer may instruct the electrically operated radiation generator 40 to operate in one or more desired operating environments and determine the first set of ratios (process block 114). In some embodiments, desired operating environments may be where living beings are properly shielded from output radiation, for example, when the electrically operated radiation generator 40 is deep downhole and/or surrounded by a (e.g., water, lead or concrete) radiation barrier. While operating at each desired operating environment, the manufacturer may determine the first radiation metric when the electrically operated radiation generator 40 is outputting radiation, the second radiation metric when the electrically operated generator 40 is not outputting radiation, and the ratio between the first radiation metric and the second radiation metric.

Additionally, the manufacturer may instruct the electrically operated radiation generator 40 to operate in one or more undesired operating environments and determine the second set of ratios (process block 116). In some embodiments, the undesired operating environments may be where living beings are not properly shielded from output radiation, for example, when the electrically operated radiation generator 40 is suspended in the air, and/or in a shallow hole. While operating in each undesired operating environment, the manufacturer may determine the first radiation metric when the electrically operated radiation generator 40 is outputting radiation, the second radiation metric when the electrically operated generator 40 is not outputting radiation, and the result of the relationship between the first radiation metric and the second radiation metric.

The manufacturer may then determine a relationship between the first set of results and the second set of results to facilitate determining the desired range of the result of the relationship (process block 118). As described above, the radiation metrics and, thus, the result of the relationship between the radiation metrics may vary based on characteristics of the surrounding environment. In fact, similar operating environments may result in similar results. As such, the manufacturer may determine the relationship by determining trends in the first set of results and the second set of results.

To help illustrate, a plot of calibration data (e.g., first set of ratios and second set of ratios) is shown in FIG. 8. Specifically, the plot indicates the ratio of the count rate (e.g., second radiation metric) determined when not outputting radiation to count rate (e.g., first radiation metric) determined when outputting radiation on the y-axis and the count rate determined when outputting radiation on the x-axis. In the depicted embodiment, the plot includes a first set of points 120 to indicate the first set of ratios (e.g., ratios determined when operating at desired operating environments), a second set of points 122 to indicate the second set of ratio (e.g., ratios determined when operated at undesired environments), and a third set of points 124 to indicate ratios determined when outputting low levels of radiation.

As described above, the desired ratio range may be determined based at least in part based on a relationship between the first set of ratios and the second set of ratios. For example, in the depicted embodiment, there is a clear separation between the first set of ratios and the second set of ratios. Specifically, ratios determined in desired operating environments are all greater than the ratios determined in undesired operating environments.

Thus, in some embodiments, the manufacturer may determine a threshold (e.g., relationship) such that each of the first set of ratios is greater than the threshold and each of the second set of ratios is less than the threshold. For example, in the depicted embodiment, the threshold may be set at 0.075 or 0.08. Thus, based on such calibration data, the manufacturer may set the desired range of the ratio at greater than 0.075 or 0.08. Additionally, the manufacturer may set an undesired range of the ratio at less than 0.075 or 0.08.

Returning to the process 88 described in FIG. 5, the control system 44 may then determine whether the ratio is within the desired ratio range (decision block 98). For example, the control system 44 may determine whether the ratio is greater than the threshold. When the ratio is greater than the threshold, the control system 44 may instruct the electrically operated radiation source 44 to continue outputting radiation (process block 102), for example, based on the burst sequence 104. On the other hand, when the ratio is not greater than the threshold, the control system 44 may instruct the electrically operated radiation source 44 to cease outputting radiation (process block 100). In this manner, the control system 44 may automatically determine whether surrounding environment properly shields living beings and cease outputting when not properly shielded to reduce amount and/or likelihood of exposing living beings to high energy radiation.

The control system 44 may, in addition or alternatively to the ratio, use other information to determine characteristics of the surrounding environment and, thus, whether to continue or cease output of radiation. For example, the control system 44 may determine whether to continue or cease output of radiation based on a single radiation metric, such as the first radiation metric determined when outputting radiation or the second radiation metric determined when not outputting radiation. Additionally, the control system 44 may determine whether radiation output is above a threshold before using the ratio to determine whether to continue or cease output of radiation.

As described above, radiation detectors (e.g., gamma ray detector 68 or neutron detector 70) may measure radiation received from the surrounding environment. To determine characteristics of the surrounding environment, the radiation detectors may attempt to detect radiation caused by interaction between radiation output from the electrically operated radiation generator 40 and the surrounding environment. Thus, when an electrically operated radiation generator 40 initially begins outputting radiation (e.g., during the startup of the generator), the ratio may experience transient fluctuations before subsequently reaching its final value. This is due to the fact that the output, e.g. the number of neutrons emitted per unit of time, is low and therefore the count rates are low in the first and second time periods and the detector response may be dominated by background radiation.

The plot of FIG. 8 helps illustrate this transient fluctuation using the third points 124. As depicted, when the electrically operated radiation generator 40 is not outputting radiation (e.g., zero or low net burst count rate), the ratio may fluctuate due to background radiation, such as radiation naturally present in the detector 42 and/or caused by previous outputs of radiation and/or the natural radiation from the formation. When the electrically operated radiation generator 40 is turned on the ratio may gradually transition from its starting point to its final value. Thus, in some instances, even when operated in a desired operating condition, the ratio may not initially be within the desired range. However, this may lead to inappropriately ceasing output of radiation from the electrically operated radiation generator 40. Accordingly, in some embodiments, the count rate (e.g., first radiation metric) may need to be greater than the background radiation by a threshold before using the ratio to determine whether to continue or cease output of radiation. In a different embodiment, which includes the presence of a neutron output monitor 64, the neutron output may need to exceed a certain limit before using the ratio to determine whether to continue or cease output of radiation. In yet a different embodiment, the neutron output may be inferred from the operating parameters of the neutron generator such as but not limited to an ion beam current, an ion source filament current, a target voltage, and an ion source grid current.

As such, the technical effects of the present disclosure include improving control over operation of an electrically operated radiation source to reduce amount and/or likelihood of exposing living beings to output radiation. In some embodiments, a control system uses a ratio between a first radiation metric determined when outputting radiation and a second radiation metric determined when not outputting radiation to determine characteristics of the surrounding environment. For example, the control system may use the ratio to determine whether the instrument is properly shielded to prevent unintended radiation exposure to living beings or the environment in general. When not properly shielded, the control system may automatically instruct the electrically operated radiation source to cease outputting radiation.

Figure 9:
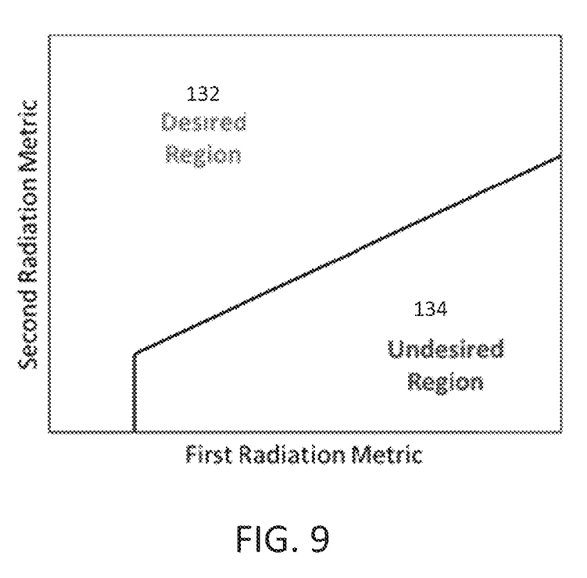
FIG. 9 is a plot of an example of a desired region and an undesired region of a relationship between the first and second radiation metrics.

Although the above description illustrates several embodiments where a radiation system is assessed to determine whether it is operating in a desired condition, variations to these embodiments are possible without departing from the teaching of the current disclosure. For example, instead of using a ratio between a first radiation metric and a second radiation metric, one may simply derive a correlation between the first radiation metric with the second radiation metric without computing a ratio between the two. FIG. 9 illustrates one such variation. In this embodiment, the second radiation metric is plotted against the first radiation metric, with a desired region 132 and an undesired region 134 being designated. As such, when the radiation generator is operating under a desired condition, the corresponding first and second radiation metrics fall in the desired region 132, and the control system would not interfere with the operation of the radiation generator. If, however, the radiation generator is operating under an undesired condition, such as when the radiation generator is out of borehole or not properly shielded, the corresponding first and second radiation metrics fall into the undesired region 134, therefore automatically shutting down the electrically operated radiation source to cease outputting radiation.

In some embodiments, the first radiation metric is based at least in part on radiation measured by a radiation detector such as a gamma ray detector 68 or a neutron detector 70. In some other embodiments, the first radiation metric is based at least in part on radiation measured by a radiation output monitor 64 such as a fast neutron detector. In some further embodiments, the first radiation metric is based at least in part on radiation inferred or otherwise determined indirectly from circumstantial parameters such as operating conditions of the generator. Examples of such parameters include, but are not limited to, an ion beam current, an ion source filament current, a target voltage, an ion source grid current, or the overall power consumption of the radiation generator.

Moreover, even though the foregoing embodiments are illustrated in the context of a first radiation metric and a second radiation metric, one or more additional metrics can be used to further improve the operation of the radiation generator. Such metrics can be derived from actual data acquired during logging, experimental data gathered from a laboratory, simulated data from a computer model, or a combination thereof. All such variations are considered within the scope of the current disclosure.

The specific embodiments described above have been shown by way of example, and it should be understood that these embodiments may be susceptible to various modifications and alternative forms. It should be further understood that the claims are not intended to be limited to the particular forms disclosed, but rather to cover modifications, equivalents, and alternatives falling within the spirit and scope of this disclosure.

What is claimed is:

1. A downhole tool, comprising:
   an electrically operated radiation generator configured to selectively output radiation to a surrounding environment based at least in part on supply of electrical power;
   a radiation detector configured to:
     measure first radiation when the electrically operated radiation generator is outputting radiation;
     measure second radiation when the electrically operated radiation generator is not outputting radiation; and
   a control system configured to:
     determine a first radiation metric based at least in part on the first radiation;
     determine a second radiation metric based at least in part on the second radiation; and
     determine whether the surrounding environment is properly shielded based at least in part on a relationship between the first radiation metric and the second radiation metric.

2. The downhole tool of claim 1, wherein the relationship between the first radiation metric and the second radiation metric is a ratio between the first radiation metric and the second radiation metric.

3. The downhole tool of claim 2, wherein the control system is configured to determine whether the surrounding environment is properly shielded based at least in part on whether the ratio is within a desired range; wherein the desired range is determined based at least in part on a relationship between a first set of ratios determined while operating the electrically operated radiation generator in desired operating environments and a second set of ratios determined while operating the electrically operated radiation generator is undesired operating environments.

4. The downhole tool of claim 1, wherein the radiation detector is configured to:
   measure the first radiation during one or more burst periods in a burst sequence; and
   measure the second radiation during one or more burst delay periods in the burst sequence, wherein the burst delay period is directly before or directly after the burst period.

5. The downhole tool of claim 4, wherein:
   the radiation detector is configured to determine a background radiation during a sequence delay period in the burst sequence, wherein the electrically operated radiation generator is configured to not output radiation during the sequence delay period; and
   the control system is configured to:
     determine the first radiation metric by subtracting the background radiation from the first radiation; and
     determine the second radiation metric by subtracting the background radiation from the second radiation.

6. The downhole tool of claim 5, wherein the control system is configured to determine whether the surrounding environment is properly shielded after the first radiation is greater than the background radiation by a threshold amount.

7. The downhole tool of claim 1, wherein the control system is configured to:
   automatically determine whether the surrounding environment is properly shielded; and
   automatically instruct the electrically operated radiation source to cease outputting radiation when the surrounding environment is not properly shielded.

8. The downhole tool of claim 1, wherein first radiation metric and the second radiation metric comprise the same type of radiation metric, wherein the types comprise total count, total count rate, integrated charge, total energy deposited, count in an energy range, count rate in an energy range, count in a time window, count rate in a time window, count at a pulse height, count rate at a pulse height, ratio of counts above a discriminator level, ratio of count rates above a discriminator level, spectrum of counts as a function of energy, spectrum of count rates as a function of energy, spectrum of counts as a function of time, spectrum of count rates as a function of time, spectrum of counts as a function of pulse height, spectrum of count rate as a function of pulse height, spectral yield, or any combination thereof.

9. The downhole tool of claim 1, wherein:
   the downhole tool comprises a logging-while-drilling tool, a measuring-while-drilling tool, a telemetry tool, a wireline tool, coiled tubing tool, a wired drill pipe tool, or a slick line tool;
   the electrically operated radiation generator comprises an x-ray generator, a neutron generator, or a gamma ray generator; and
   the radiation detector comprises a gamma ray detector, a neutron detector, or a detector configured to detect both neutrons and gamma rays.

10. A system, comprising:
   an electrically operated radiation generator configured to selectively output radiation to a surrounding environment;

a radiation detector configured to measure radiation from the surrounding environment induced by the output radiation;

a control system configured to:
determine a first radiation metric based at least in part on the output radiation;
determine a second radiation metric based at least in part on radiation measured by the radiation detector; and
determine whether the surrounding environment is operating under a desired condition based at least in part on a relationship between the first radiation metric and the second radiation metric.

11. The system of claim 10, wherein the relationship is at least partially determined by (a) a first set of second radiation metrics determined while operating the electrically operated radiation generator in desired operating environments and (b) a second set of second radiation metrics determined while operating the electrically operated radiation generator in undesired operating environments.

12. The system of claim 10, wherein the control system is able to determine the surrounding environment is not properly shielded after the first radiation is greater than the background radiation by a threshold amount.

13. The system of claim 10, wherein the control system is configured to:
automatically determine whether the surrounding environment is operating under a desired condition; and
automatically instruct the electrically operated radiation source to cease outputting radiation when the surrounding environment is not operating under the desired condition.

14. The system of claim 10, wherein the second radiation metric comprise total count, total count rate, integrated charge, total energy deposited, count in an energy range, count rate in an energy range, count in a time window, count rate in a time window, count at a pulse height, count rate at a pulse height, ratio of counts above a discriminator level, ratio of count rates above a discriminator level, spectrum of counts as a function of energy, spectrum of count rates as a function of energy, spectrum of counts as a function of time, spectrum of count rates as a function of time, spectrum of counts as a function of pulse height, spectrum of count rate as a function of pulse height, spectral yield, or any combination thereof.

15. The system claim 10, wherein:
the system comprises a logging-while-drilling tool, a measuring-while-drilling tool, a telemetry tool, a wireline tool, coiled tubing tool, a wired drill pipe tool, or a slick line tool;
the electrically operated radiation generator comprises an x-ray generator, a neutron generator, or a gamma ray generator; and
the radiation detector comprises a gamma ray detector, a neutron detector, or a detector configured to detect both neutrons and gamma rays.

16. The system of claim 10, wherein the desired condition includes when the system is operating in a wellbore penetrating a subterranean formation, or is properly shielded out of the wellbore.

17. A system for logging a subterranean formation, comprising:
an electrically operated radiation generator configured to output radiation to a surrounding environment;
a control system coupled to the electrically operated radiation generator,
wherein the control system is configured to:
determine a first radiation metric based at least in part on the output radiation;
determine a second radiation metric based at least in part on a signal from the surrounding environment in response to the radiation; and
determine whether the surrounding environment is operating under a desired condition based at least in part on a relationship between the first radiation metric and the second radiation metric.

18. The system of claim 17, further comprising:
automatically instruct the electrically operated radiation source to cease outputting radiation when the surrounding environment is not operating under the desired condition.

19. The system of claim 17, wherein the first radiation metric is determined at least in part when the electrically operated radiation generator is outputting radiation.

20. The system of claim 17, wherein the second radiation metric is determined at least in part when the electrically operated radiation generator is not outputting radiation.

* * * * *